(12) United States Patent
Abbott et al.

(10) Patent No.: US 10,086,544 B2
(45) Date of Patent: *Oct. 2, 2018

(54) LAMINATE RESIN TRANSFER MOLDING OF FIBROUS PREFORMS USING PARTICLE FILLED RESIN SYSTEMS

(71) Applicant: UNITED TECHNOLOGIES CORPORATION, Hartford, CT (US)

(72) Inventors: Michael G Abbott, Jupiter, FL (US); Kathryn S Read, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 327 days.

This patent is subject to a terminal disclaimer.

(21) Appl. No.: 14/879,375

(22) Filed: Oct. 9, 2015

(65) Prior Publication Data

US 2017/0100864 A1 Apr. 13, 2017

(51) Int. Cl.
*B29C 45/02* (2006.01)
*B29C 35/02* (2006.01)
*B29C 70/68* (2006.01)
*B29C 70/48* (2006.01)
*C04B 35/80* (2006.01)
*B29K 83/00* (2006.01)

(52) U.S. Cl.
CPC .............. *B29C 45/02* (2013.01); *B29C 35/02* (2013.01); *B29C 70/48* (2013.01); *B29C 70/68* (2013.01); *C04B 35/806* (2013.01); *B29K 2083/00* (2013.01)

(58) Field of Classification Search
None
See application file for complete search history.

(56) References Cited

U.S. PATENT DOCUMENTS

| 5,441,692 A * | 8/1995 | Taricco ................. B29C 70/48 264/257 |
| 5,628,938 A | 5/1997 | Sangeeta et al. |
| 5,853,653 A | 12/1998 | Donato et al. |
| 7,628,942 B1 | 12/2009 | Miller et al. |

FOREIGN PATENT DOCUMENTS

CN 102941722 A 2/2013

OTHER PUBLICATIONS

European Extended Search Report dated Mar. 27, 2017, issued in the corresponding European Patent Application No. 16192942.7.
Erdal M. et al: "Impregnation Molding of Particle Filled Preceramic Polymers Into Fiber Preforms", Ceramic Engineering and Science Proceedings, American Ceramic Society Inc, US, No. 4, Jan. 1, 1996, pp. 79-89, XP000641836, ISSN: 0196-6219.
Stantschev G. et al: "Long Fibre Reinforced Ceramics With Active Fillers and a Modified Intra-Matrix Bond Based on The LPI Process", Journal of the European Ceramic Society, Elsevier Science Publishers, Barking, Essex, GB, vol. 25, No. 2-3, Jan. 1, 2005, pp. 205-209, XP027618212, ISSN: 0955-2219.

* cited by examiner

*Primary Examiner* — Monica Huson
(74) *Attorney, Agent, or Firm* — Bachman & LaPointe, P.C.

(57) ABSTRACT

A process for manufacturing a ceramic matrix composite component, said process comprising inserting at least one fibrous sheet into a resin transfer molding system. The process includes wetting the at least one (dry or partially wetted) fibrous sheet with a neat first pre-ceramic polymer resin. The process includes injecting a second pre-ceramic polymer resin including a filler material into at least one fibrous sheet and curing the pre-ceramic polymer resin.

12 Claims, 2 Drawing Sheets

LAMINATE RESIN TRANSFER MOLDING OF FIBROUS PREFORMS USING PARTICLE FILLED RESIN SYSTEMS

BACKGROUND

In liquid infusion processing, the reinforcing fibers are placed within a mold cavity or other mechanism for near-net or net-shape tooling in dry or partially wetted (through the use of a compatible material for adhering the fibers to themselves, i.e. a tackifier) conditions, further wetted with the matrix resin, and cured. Liquid infusion processing may be accomplished by a variety of techniques, including high and low pressure Resin Transfer Molding (RTM), Resin Film Infusion (RFI), Vacuum Assisted Resin Transfer Molding (VARTM) and Same Qualified Resin Transfer Molding (SQRTM).

The liquid infusion process may include any process by which the reinforcing fibers with or without particulate filler material are first placed into a mold cavity, die head, or any other means of near-net or net shaped tooling and then wetted with the resinous matrix, again with or without particulate filler material, and cured.

Ceramic Matrix Composite (CMC) pre-ceramic polymer resins are not chemically stable when heated to temperatures below their pyrolysis temperature and therefore provide a challenge to molding a void/defect free laminate via liquid infusion processes.

Prior to, during and even after initial cure the pre-ceramic resins have demonstrated a propensity for release of gaseous compounds. These gases can interfere with the complete filling of the fiber preform during resin injection, leading to a cured laminate with varying amounts, sizes and shapes of porosity. Unwanted porosity can also be formed for other reasons, such as improper filling of the resins. It is known that during Polymer Infiltration and Pyrolysis (PIP), large pores in the cured laminate will propagate to the pyrolyzed laminate and may remain open within the laminate through final densification.

In addition to the interference of the gases, injection of particulate filled preceramic polymer resin into fiber preforms during RTM can result in filtering of the particulate fillers from the resin, minimizing the beneficial aspects of the addition of the particulate filler material.

SUMMARY

In accordance with the present disclosure, there is provided a process for manufacturing a ceramic matrix composite component.

In accordance with the present disclosure, there is provided a resin transfer molding system comprising a tool having an upper surface. A cover plate is coupled with the tool proximate the upper surface. An inner cavity is formed between the tool and the cover plate. A vacuum pump is fluidly coupled to the inner cavity. A pump is fluidly coupled to the inner cavity and configured to pump a first neat resin and a second filled resin into the inner cavity. Optionally, the vacuum pump can draw the resins into the inner cavity without the use of the pump.

In an exemplary embodiment the pump is fluidly coupled to a first resin source and a second resin source.

In an exemplary embodiment the system further comprises an intensifier located in the inner cavity and thermally coupled to the tool and a thermal energy subsystem is thermally coupled to the tool.

In an exemplary embodiment the system further comprises a flexible bag insertable in the inner cavity between the cover plate and the intensifier; and a seal being coupled between the cover plate and the tool and configured to fluidly seal the inner cavity.

In an exemplary embodiment the first resin comprises a pre-ceramic polymer resin selected from the group consisting of polycarbosilanes and polysilazanes.

In an exemplary embodiment the second resin comprises a pre-ceramic polymer resin and filler material selected from the group consisting of alpha and beta SiC and B4C.

In accordance with the present disclosure, there is provided a process for manufacturing a laminate ceramic composite component comprises inserting at least one fibrous sheet into a resin transfer molding system. The process includes wetting the at least one fibrous sheet first with a neat pre-ceramic polymer resin and performing a post injection hold configured to allow for the first pre-ceramic polymer resin to be absorbed into the at least one fibrous sheet. The process includes injecting a second pre-ceramic polymer resin into the at least one fibrous sheet, wherein the second pre-ceramic polymer resin contains filler material. The process includes curing the pre-ceramic polymer resin.

In an exemplary embodiment the process further comprises suppressing void formation resultant from gases formed in the pre-ceramic polymer resin.

In an exemplary embodiment the process further comprises encapsulating said at least one fibrous sheet and pre-ceramic polymer resin beneath a cover plate and a tool.

In an exemplary embodiment the process further comprises encapsulating the at least one fibrous sheet and pre-ceramic polymer resin between a cover plate and a tool, with the cover plate being coupled to the tool. In an alternative embodiment, a pressure intensifier can be inserted between the tool and the at least one fibrous sheet and pre-ceramic polymer resin.

In an exemplary embodiment the pressure intensifier comprises a cured elastomer having a high coefficient of thermal expansion.

In an exemplary embodiment the process further comprises heating the pressure intensifier to induce a thermal expansion of the intensifier.

In an exemplary embodiment the pre-ceramic polymer resin is selected from the group consisting of polycarbosilanes and polysilazanes.

In an exemplary embodiment the process further comprises uniformly applying pressure to the at least one fibrous sheet and pre-ceramic polymer resin to ensure wet out and consolidation.

In an exemplary embodiment the filler material of second pre-ceramic polymer resin is selected from the group consisting of alpha and beta SiC and B4C.

Other details of the resin transfer molding system and process are set forth in the following detailed description and the accompanying drawing wherein like reference numerals depict like elements.

DETAILED DESCRIPTION

Figure 1:
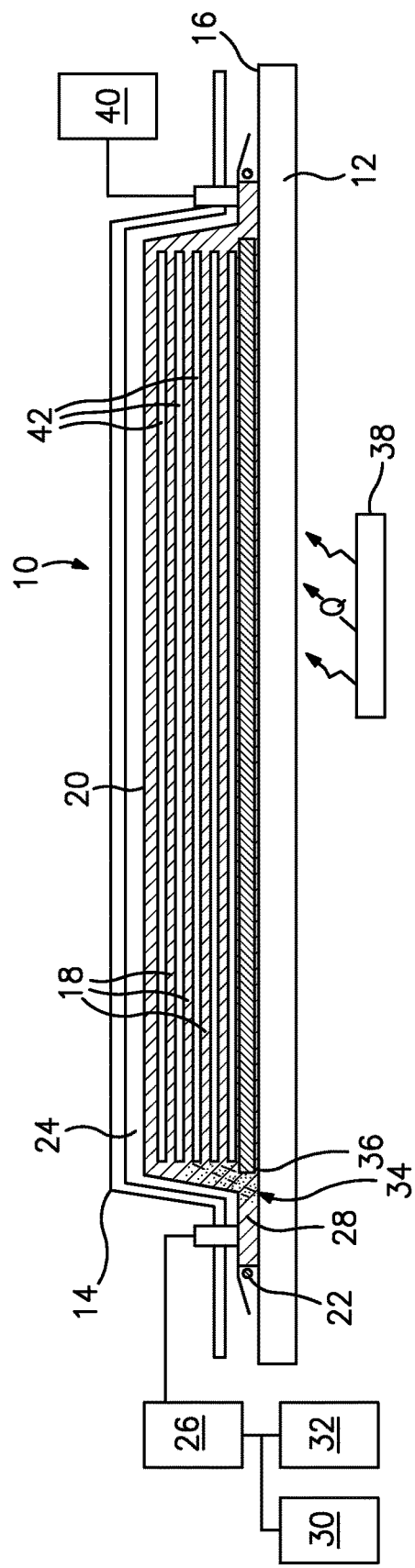
FIG. 1 is a schematic representation of a resin transfer molding system.

Referring now to FIG. 1, there is illustrated a resin transfer molding system 10. The resin transfer molding system 10 is typically used to create a composite material that is constructed from a fibrous sheet that is impregnated with a resin. Although a composite material is shown and described, it is to be understood that the present invention can be used to create other parts which are formed by pressure and a tool. It is also noted that the resin transfer molding system 10 is shown as a flat shaped plate, other shapes and forms can be utilized depending on the ultimate final shape of the composite component.

The resin transfer molding system 10 includes a tool 12. The tool 12 can be constructed from composite materials, thin film metals, ceramics or conventional metallic materials. The tool 12 includes a cover plate 14 configured to enclose an upper surface 16 of the tool 12, encapsulate and seal the contents of the tool 12.

Adjacent to the tool 12 is at least one fibrous sheet 18, and shown as multiple sheets 18, which are used to create the composite material. The fibrous sheet can include any dry fabrics, tackified fabrics, prepreg fabrics, three dimensional woven or braided preforms, and other previously formed fiber filled sections.

The sheets 18 are enclosed by the cover plate 14. The cover plate 14 may be constructed from the same rigged material as the tool 12. The cover 28 may also be a flexible bag 20 made of a material, such as nylon, which can be sealed to the tool 12 with a seal 22.

The cover plate 14 and tool 12 define an inner cavity 24. The inner cavity 24 is in fluid communication with a pump 26 configured to pump a resin 28. The pump 26 may be capable of pressurizing the inner cavity 24. The pump 26 can be fluidly coupled to a source of resin 30 and/or a source 32 of the mixture of the resin 28 and a particulate filler material 34, also called a filled resin 32.

The resin 28 is a material which binds and forms a composite with the fibrous material 18 when subjected to elevated temperatures and pressures. In exemplary embodiments, there are thermoset-type or thermoplastic-type pre-ceramic polymer resins. In an exemplary embodiment, the resin 28 is ceramic matrix composite pre-ceramic polymer resin. The resin 28 can include particulate filler material 34. The mixture of resin 28 and filler material 34 together provide greater structural stability and higher ceramic yields. Examples of these pre-ceramic polymer resins include polycarbosilanes and polysilazanes. Fillers can be identified by chemistry; examples are alpha and beta SiC and B4C. The size of the particulate can be varied as well. The particulate can be uniform in size, bimodal in distribution or random.

An optional pressure intensifier 36 can be included in the resin transfer molding system 10. The pressure intensifier 36 comprises a cured elastomer such as silicone rubber material (or functional equivalent) having a high coefficient of thermal expansion that expands when heated. In an exemplary embodiment the coefficient of thermal expansion can be greater than 75 micro in/in Fahrenheit. The pressure intensifier 36 is placed adjacent the upper surface 16 of the tool 12 proximate the fibrous sheets 18. The pressure intensifier 36 is configured to apply pressure to the fibrous sheets 18 and resin 28 upon being heated.

Segregation of the Particulate Filler material during RTM injection is a function of multiple processing, tooling and material variables. One potential mechanism driving segregation at the laminate level is the absorption of the liquid polymer resin 28 into the individual tow bundles of fibrous sheets 18 by capillary action after injection, leaving non-uniform concentrations of filler material 34. In order to mitigate the segregation of the resin 28 and filler material 34, a two-step injection process for RTM of particulate filled preceramic polymer resins can be performed.

The first injection cycle is performed with unfilled (neat) resin 28 at temperatures below the cure temperature of the resin 28 and includes a post-injection hold to allow for absorption of the resin 28 into the tow bundles of fibrous sheets 18. A second injection cycle is then performed with the filled resin 32 to evenly distribute the filler material throughout the intra-tow regions of fibrous sheets 18.

Finally, the resin 28 and filled resin 32 are cured to the green state prior to pyrolysis. The phenomenon that separates the particulate filler 34 from the resin 28 also has been found to leave voids in the laminate as well. The second injection fills these voids.

Figure 2:
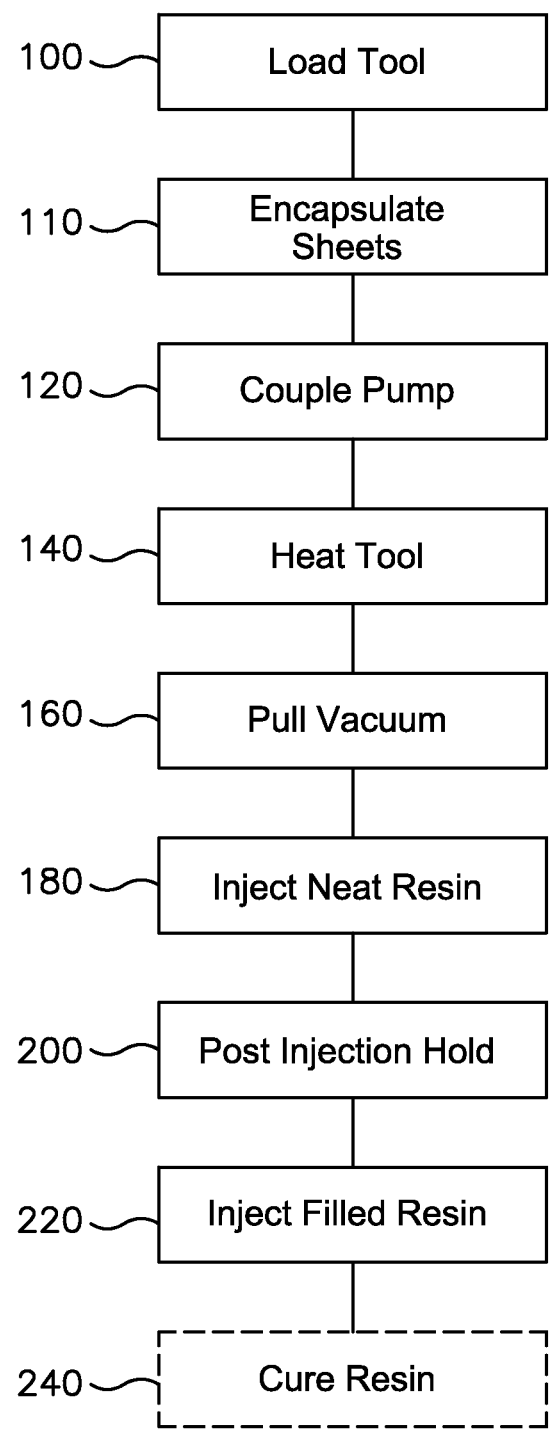
FIG. 2 is a process diagram of an exemplary resin transfer molding process.

Referring also to FIG. 2, to form a composite sheet, at step 100, the fibrous sheets 18 are inserted into the tool 12. The sheets 18 can be wetted or dry sheets 18. In an exemplary embodiment, the sheets 18 can encompass 3D woven or braided fiber preforms. In an exemplary embodiment the sheets 18 can be placed onto the tool 12 on top of the intensifier 36 or vice versa. The cover plate 14 is then coupled to the tool 12 to encapsulate the sheets 18, at step 110. The pump 26 is coupled to the tool 12, at step 120. The tool 12 may be heated by a thermal energy subsystem 38 to remove any residual water that may exist in the sheet or tooling, at step 140.

A vacuum is pulled within the inner cavity 24 of the tool 12 by a vacuum pump 40, at step 160.

At step 180, the neat resin 28 is introduced to the inner cavity 24 from the resin source 30. The resin 28 is neat and has no filler material 34. The temperature of the resin 28 is below the cure temperature of the resin 28. The resin can be induced to flow into the inner cavity 24 by the vacuum created within the tool inner cavity 24, by positively pumping the resin 28 into the inner cavity 24, or both. As shown in FIG. 1, the resin 28 fills the gaps 36 between the fibrous sheets 18.

As shown in FIG. 1, the resin 28 flows through the sheets 18 from the gaps 36. The diffusion of resin 28 from the gaps 42, more evenly distributes the resin 28 throughout the sheets 18 and provides a composite part that has a relatively uniform concentration of resin 28.

A post resin 28 injection hold is performed at step 200. The hold allows for the neat resin 28 to be absorbed into the fibrous sheets 18. The period of time for the hold can vary, but in an exemplary embodiment, a time range of from 5 minutes to 1 hour can be employed.

At step 220, a second injection cycle is performed. The filled resin 32 comprising a mixture of resin 28 and filler material particles 34 is introduced to the inner cavity 24 from the filled resin source 32. The resin 28 has filler material 34. The filler material 34 is evenly distributed throughout the intra-tow regions/gaps 42.

Optionally, the tool 12 is heated from the thermal energy subsystem 38. The heat Q from the thermal energy subsystem 38 transfers through the tool 12 into the pressure intensifier 36. As the intensifier 36 is heated, the intensifier 36 expands and presses the sheets 18 and resin 28 within the mold cavity. In an exemplary embodiment, the intensifier 36 can apply a pressure of from about 50 pounds per square inch (psi) to as high as 800 psi. Other means of exerting pressure on the sheets 18 can also be deployed.

As explained above, prior to, during and even after initial cure the pre-ceramic resins 28 have demonstrated a propensity for release of gaseous compounds. These gases can interfere with the complete filling of the fiber preform during resin injection, leading to a cured laminate with varying amounts, sizes and shapes of porosity.

The use of pressure, developed through the implementation of an intensifier or by other means 30, suppresses the formation and release of the gaseous compounds in the laminate formed from the resin 28 and fibrous sheets 18. By suppressing the outgassing of the resin 28, unwanted voids and the resultant porosity is avoided in the composite material component. The second injection 220 of the two step injection cycle, serves to fill any voids that may remain in the composite material component.

Optionally, at step 240, the resins 28/32 are cured to the green state prior to pyrolysis.

Using the ceramic matrix composite pre-ceramic polymer resin with the RTM process can result in large voids and defects in the cured laminate that propagate to the pyrolyzed laminate during PIP and are not filled during final densification. The disclosed resin transfer molding system enables one to cure a laminate by RTM using pre-ceramic polymer resin such that large pores are not present and the gas/porosity evolution is either suppressed or results in very small, finely dispersed porosity.

For final densification various processes can be employed such as; PIP, Melt Infiltration (MI) or Chemical Vapor Infiltration (CVI).

The resin transfer molding system and method (or functionally equivalent method) can be applicable to flat panels as well as complex 3-D geometric shapes including those forming functional components.

The exemplary resin transfer molding system is a closed tool process in which a dry or partially wetted fiber preform is enclosed in matched metal tooling and resin is injected under pressure to wet out the preform. The tool is then heated to cure the resin, resulting in a composite laminate. The closed tooling creates a dimensionally repeatable part.

Uniform Distribution of Particulate Filler material and complete wetting of the laminate volume, both inter-tow and intra-tow, in the green state CMC laminate will produce a stable laminate after pyrolysis with uniform, predictable matrix shrinkage cracks. This behavior is beneficial to subsequent re-infiltrations, including final densification via CVI, as well as modeling techniques for analytical behavior prediction.

By preventing segregation of filler material and minimizing the voids developed during cure, the exemplary system and method allow for the successful densification of the laminate through processes such as Polymer Infiltration and Pyrolysis (PIP), Melt Infiltration (MI) or Chemical Vapor Infiltration (CVI). A highly dense material is critical to the durability of the material.

Without the use of the exemplary resin transfer molding system and method a more porous Ceramic Matrix Composite (CMC) can result, the greater porosity compromising the composite and the capacity of the composite to meet target life requirements and ultimately increasing cost.

There has been provided a resin transfer molding system and process. While the resin transfer molding system and process have been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A resin transfer molding system comprising:
a tool having an upper surface;
a cover plate coupled with said tool proximate said upper surface;
an inner cavity formed between said tool and said cover plate;
an intensifier located in said inner cavity and thermally coupled to said tool;
a vacuum pump fluidly coupled to said inner cavity; and
a pump fluidly coupled to said inner cavity and configured to pump a first neat resin and a second filled resin into said inner cavity.

2. The system according to claim 1, wherein said pump is fluidly coupled to a first resin source and a second resin source.

3. The system according to claim 1, further comprising:
a thermal energy subsystem thermally coupled to said tool.

4. The system according to claim 3, further comprising:
a seal coupled between said cover plate and said tool and configured to fluidly seal said inner cavity.

5. The system according to claim 1, wherein said first resin comprises a pre-ceramic polymer resin selected from the group consisting of polycarbosilanes and polysilazanes.

6. The system according to claim 1, wherein said second resin comprises a pre-ceramic polymer resin and filler material selected from the group consisting of alpha and beta SiC and B4C.

7. A process for manufacturing a laminate ceramic composite component, said process comprising:
inserting at least one fibrous sheet into a resin transfer molding system;
wetting said at least one fibrous sheet with a neat first pre-ceramic polymer resin;
performing a post injection hold configured to allow for said first pre-ceramic polymer resin to be absorbed into said at least one fibrous sheet;
injecting a second pre-ceramic polymer resin into said at least one fibrous sheet, wherein said second pre-ceramic polymer resin comprises filler material; and
encapsulating said at least one fibrous sheet and pre-ceramic polymer resin beneath a cover plate, said cover plate being coupled to a tool;
encapsulating said at least one fibrous sheet and pre-ceramic polymer resin between a pressure intensifier and said cover plate, wherein said pressure intensifier comprises a cured elastomer having a high coefficient of thermal expansion.

8. The process of claim 7, further comprising:
suppressing void formation resultant from gases formed in said pre-ceramic polymer resin.

9. The process of claim 7, further comprising:
heating said intensifier to induce a thermal expansion of said intensifier.

10. The process of claim 7, wherein said pre-ceramic polymer resin is selected from the group consisting of polycarbosilanes and polysilazanes.

11. The process of claim 7, further comprising:
uniformly applying pressure to the at least one fibrous sheet and pre-ceramic polymer resin to ensure wet out and consolidation.

12. The process of claim 7, wherein said filler material of second pre-ceramic polymer resin is selected from the group consisting of alpha and beta SiC and B4C.

* * * * *